United States Patent [19]
Wells

[11] Patent Number: 5,356,176
[45] Date of Patent: Oct. 18, 1994

[54] VEHICLE OCCUPANT RESTRAINT APPARATUS

[75] Inventor: Roger F. Wells, Yorbalinda, Calif.

[73] Assignee: TRW Technar Inc., Irwindale, Calif.

[21] Appl. No.: 67,472

[22] Filed: May 25, 1993

[51] Int. Cl.⁵ ............................................. B60R 21/26
[52] U.S. Cl. .................... 280/737; 280/736; 280/741; 73/720
[58] Field of Search ............. 280/737, 736, 741, 742; 222/5; 137/68.2; 73/720, 721

[56] References Cited

U.S. PATENT DOCUMENTS

| | | | |
|---|---|---|---|
| 1,559,063 | 10/1925 | Becker . | |
| 2,489,293 | 11/1949 | Holmes | 73/720 |
| 3,527,099 | 9/1970 | Herceg | 73/720 |
| 3,691,521 | 10/1972 | Schaefer | 340/52 R |
| 3,771,121 | 11/1973 | Lohr | 340/52 R |
| 3,774,150 | 11/1973 | Matsui et al. | 280/736 |
| 3,828,333 | 8/1974 | Bryant | 340/236 |
| 3,850,039 | 11/1974 | Brakebill | 280/741 |
| 4,049,935 | 9/1977 | Gruber | 280/736 |
| 4,206,437 | 6/1980 | Wu | 338/36 |
| 4,498,070 | 2/1985 | Lirman | 73/720 |
| 4,770,045 | 9/1988 | Nakagawa et al. | 73/720 |
| 4,776,219 | 10/1988 | Friedrich | 73/726 |
| 4,840,067 | 6/1989 | Nishida et al. | 73/726 |
| 5,174,158 | 12/1992 | Kremidas | 73/720 |

*Primary Examiner*—Margaret A. Focarino
*Assistant Examiner*—Christopher P. Ellis
*Attorney, Agent, or Firm*—Tarolli, Sundheim & Covell

[57] ABSTRACT

An apparatus (10) for use in inflating a vehicle occupant restraint (12) includes a pressure vessel (14) and a leakage detecting assembly (68). The pressure vessel (14) stores gas, and has a closure wall (40) which ruptures to release the gas from the pressure vessel (14) to inflate the vehicle occupant restraint (12). The closure wall (40) is movable under the influence of a change in the gas pressure within the pressure vessel (14). The leakage detecting assembly (68) senses movement of the closure wall (40) which occurs under the influence of a change in the gas pressure that is caused by leakage from the pressure vessel (14). The leakage detecting assembly (68) generates an electrical signal in response to such movement of the closure wall (40). The leakage detecting assembly (68) does not generate the electrical signal in response to movement of the closure wall (40) which occurs under the influence of a change in the gas pressure that is caused by a change in the ambient temperature of the pressure vessel (14).

16 Claims, 4 Drawing Sheets

VEHICLE OCCUPANT RESTRAINT APPARATUS

BACKGROUND OF THE INVENTION

1. Field of the Invention

The present invention relates to an apparatus for inflating a vehicle occupant restraint such as an air bag. More specifically, the present invention relates to an apparatus including a pressure vessel which contains gas for inflating an air bag, and an assembly for detecting leakage of the gas from the pressure vessel.

2. Description of the Prior Art

U.S. Pat. No. 3,771,121 discloses an apparatus including a pressure vessel which contains gas for inflating an air bag in a vehicle. The apparatus also includes a pressure sensing assembly which senses the gas pressure within the pressure vessel. The pressure sensing assembly includes an electrically conductive diaphragm which is supported within the pressure vessel. The pressure sensing assembly has a conducting mode in which the gas pressure within the pressure vessel holds the diaphragm in contact with an electrical contact member. The diaphragm thus completes an electrical circuit between a power source and the electrical contact member when the pressure sensing assembly is in the conducting mode. When the gas pressure within the pressure vessel falls below a predetermined level which is required to inflate the air bag, the gas pressure is no longer sufficient to hold the diaphragm in contact with the electrical contact member. The diaphragm then moves out of contact with the electrical contact member, and the pressure sensing assembly is thus shifted into a non-conducting mode. A switching assembly senses shifting of the pressure sensing assembly into the non-conducting mode, and responds by actuating a lamp on the vehicle instrument panel to indicate to a vehicle occupant that the gas pressure has fallen below the level required to inflate the air bag.

SUMMARY OF THE INVENTION

In accordance with the present invention, an apparatus for use in inflating a vehicle occupant restraint comprises a means for defining a pressure vessel for storing gas, and a pressure sensing means for sensing a change in the gas pressure within the pressure vessel. The pressure vessel has a closure wall which ruptures to release the gas from the pressure vessel to inflate the vehicle occupant restraint. The closure wall is movable under the influence of a change in the gas pressure within the pressure vessel. The pressure sensing means includes a means for sensing movement of the closure wall under the influence of a change in the gas pressure within the pressure vessel.

In a preferred embodiment of the invention, the pressure sensing means includes a movable sensor member and a means for moving the sensor member in response to movement of the closure wall. The pressure sensing means further includes a signaling means for generating an electrical signal which changes in response to movement of the sensor member. The electrical signal generated by the signaling means thus indicates when the closure wall moves under the influence of a decrease in the gas pressure that is caused by leakage from the pressure vessel. The signaling means preferably includes strain gauge means for generating the electrical signal in response to bending of the sensor member.

The preferred embodiment of the invention also includes a temperature compensating means. The temperature compensating means prevents the sensor member from moving in response to movement of the closure wall which occurs under the influence of a change in the gas pressure that is caused by a change in the ambient temperature. The temperature compensating means thus prevents the electrical signal from changing when the closure wall reacts to a change in the ambient temperature, in the absence of leakage from the pressure vessel.

The temperature compensating means preferably includes a bi-metal disk located between the closure wall and the sensor member. The bi-metal disk responds to a change in the ambient temperature by deflecting in an amount which is equal and opposite to the amount that the closure wall moves in response to the change in the ambient temperature. The bi-metal disk thus maintains the sensor member in an ordinary operating position when the closure wall moves in response to a change in the ambient temperature.

The preferred embodiment of the invention further includes an opening means for rupturing the closure wall to release the gas from the pressure vessel to inflate the vehicle occupant restraint. The opening means includes a movable opening member which is moved forcefully against the closure wall to rupture the closure wall. The movable opening member also moves forcefully against the sensor member and the bi-metal disk, and thus destroys the sensor member and bi-metal disk, when moving forcefully against the closure wall.

BRIEF DESCRIPTION OF THE DRAWINGS

The foregoing and other features of the present invention will become more apparent to one skilled in the art to which the invention relates from reading the following description with reference to the accompanying drawings, in which.

DESCRIPTION OF A PREFERRED EMBODIMENT

Figure 1:
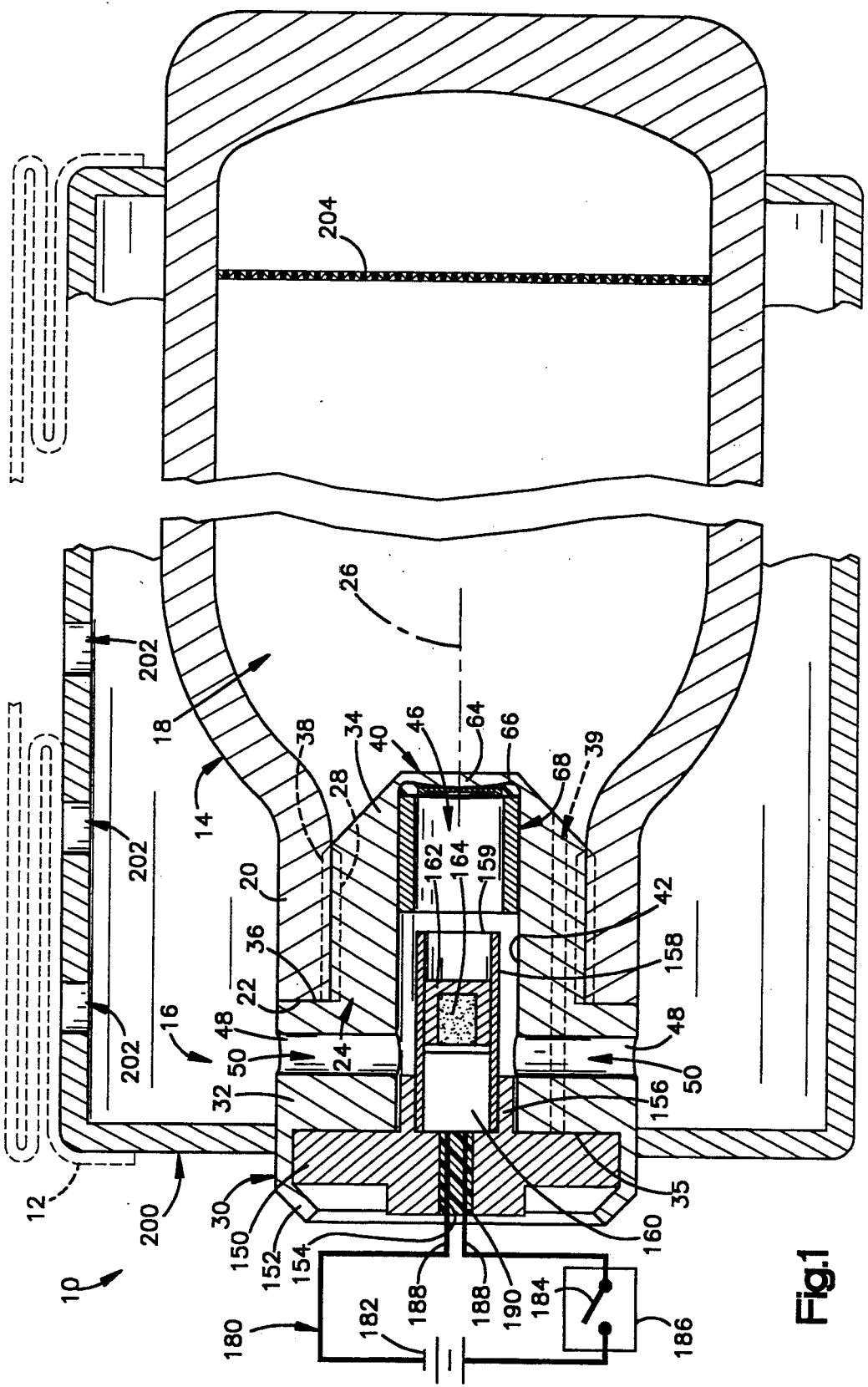
FIG. 1 is a schematic view of a vehicle occupant restraint apparatus constructed in accordance with the present invention.
Figure 2:
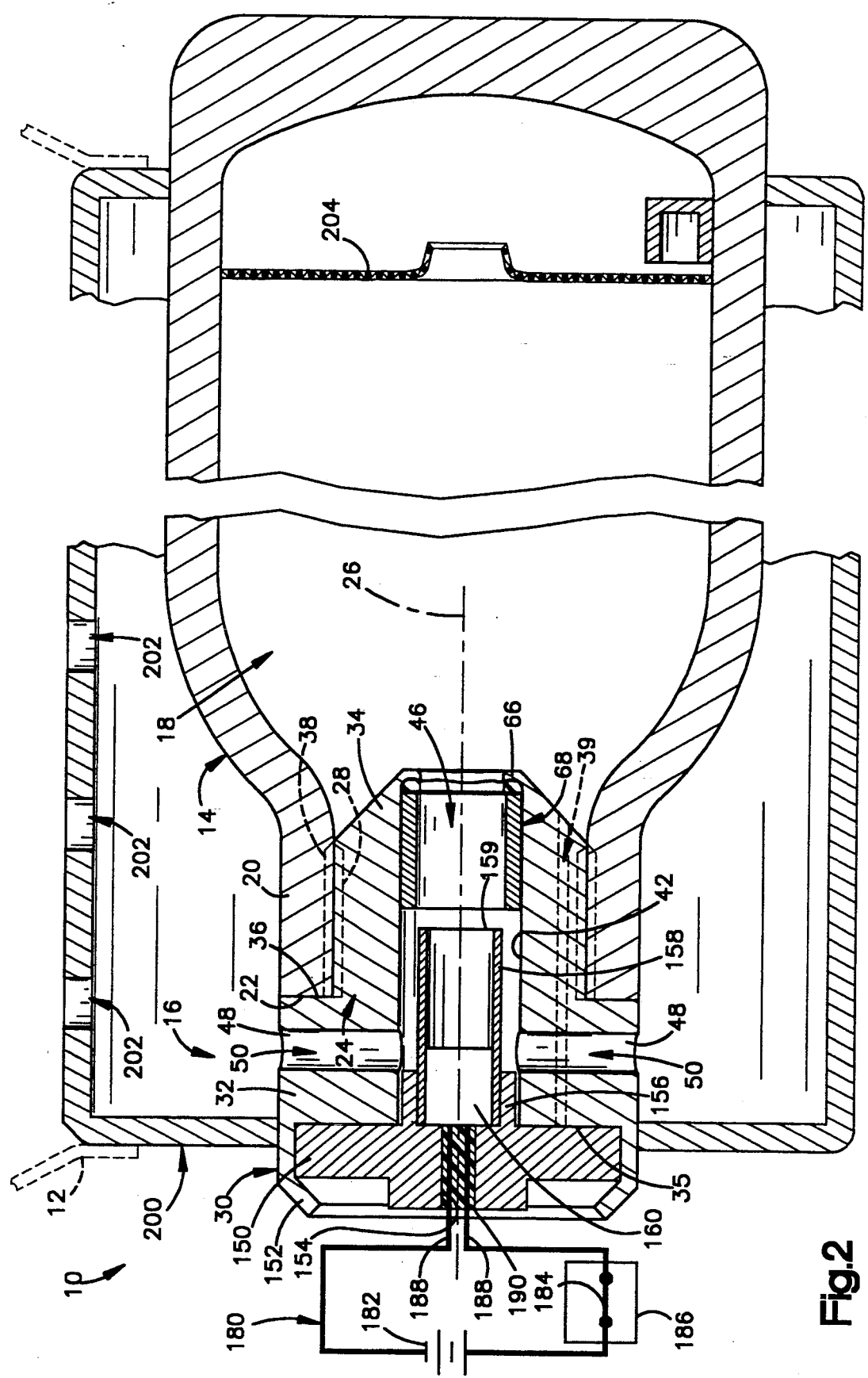
FIG. 2 is a view of the apparatus of FIG. 1 in an actuated condition.

A vehicle occupant restraint apparatus 10 constructed in accordance with the present invention is shown schematically in FIGS. 1 and 2. The apparatus 10 includes an inflatable vehicle occupant restraint 12, which is commonly referred to as an air bag. The apparatus 10 has an unactuated condition in which the air bag 12 is stored in a folded condition, as indicated in FIG. 1. The apparatus 10 also has an actuated condition in which the air bag 12 is inflated, as indicated in FIG. 2. The apparatus 10 is actuated in response to vehicle deceleration indicative of a collision. The air bag 12 is then inflated from the stored, folded condition to the inflated condition. When the air bag 12 is in the inflated condition it restrains movement of a vehicle occupant and thus protects the vehicle occupant from forcibly striking parts of the vehicle.

The apparatus 10 further includes a pressure vessel 14 with a plug assembly 16. The pressure vessel 14 defines a sealed storage chamber 18 which contains gas for inflating the air bag 12. The plug assembly 16 closes the pressure vessel 14, and includes parts for releasing the gas from the storage chamber 18. The plug assembly 16 also includes parts for detecting leakage of the gas from the storage chamber 18.

In the preferred embodiment of the invention shown in the drawings, the pressure vessel 14 is a cylindrical tank with a neck portion 20. The neck portion 20 of the pressure vessel 14 has an annular end surface 22 which defines a circular opening 24 centered on an axis 26. The neck portion 20 also has a threaded cylindrical inner surface 28 which extends coaxially inward from the opening 24.

The plug assembly 16 includes a plug member 30. The plug member 30 has an outer end portion 32 and a reduced diameter inner end portion 34. The outer end portion 32 of the plug member 30 has an annular outer end surface 35 and an annular shoulder surface 36. The inner end portion 34 has a threaded cylindrical outer surface 38. As shown in FIGS. 1 and 2, the inner end portion 34 of the plug member 30 is received coaxially through the opening 24 in the neck portion 20 of the pressure vessel 14, with the outer surface 38 of the plug member 30 in threaded engagement with the inner surface 28 of the pressure vessel 14. The shoulder surface 36 on the outer end portion 32 of the plug member 30 abuts the end surface 22 on the neck portion 20 of the pressure vessel 14. The plug member 30 thus closes the pressure vessel 14 and blocks the gas in the storage chamber 18 from flowing outward through the opening 24. The closure provided by the plug member 30 is sealed hermetically in a known manner. A bore 39 for filling the storage chamber 18 with gas extends through the plug member 30 from the outer end surface 35 to the storage chamber 18. The bore 39 contains a check valve (not shown) of known construction.

The gas contained in the storage chamber 18 comprises a mixture of gases. The mixture of gases is combustible, and is preferably designed in accordance with the invention set forth in co-pending U.S. patent application Ser. No. 761,685, filed Sep. 19, 1991, entitled "Apparatus for Inflating a Vehicle Occupant Restraint." The mixture of gases thus includes a fuel gas, an oxidizer gas for supporting combustion of the fuel gas, and an inert gas. The inert gas is preferably nitrogen, argon or a mixture of nitrogen and argon. The oxidizer gas is preferably oxygen. The fuel gas is preferably hydrogen, but may be methane, or a mixture of hydrogen and methane.

Alternatively, the mixture of gases in the storage chamber 18 may be an oxidizer gas and a fuel gas in amounts which provide a very fuel lean mixture, i.e., a mixture in which the amount of oxidizer gas exceeds that amount required to support combustion of the fuel gas.

The mixture of gases in the storage chamber 18 readily combusts, when ignited, but otherwise is not explosive. As such, the mixture of gases could have many different compositions. The fuel gas may be 2 to 16 molar percent of the mixture of gases. The oxidizer gas may be 7 to 98 molar percent of the mixture of gases. The balance is inert gas which may be 0 to 91 molar percent of the mixture of gases. Preferably, the mixture of gases includes 10–14 molar percent hydrogen, 15–25 molar percent oxygen, and 61–75 molar percent inert gas. Most preferably, the mixture of gases includes 12.5 molar percent hydrogen and 20 molar percent oxygen, with the balance being nitrogen.

The mixture of gases in the storage container 18 is normally under pressure. The pressure depends upon such factors as the volume of the air bag 12 to be inflated, the time available for inflation, the inflation pressure desired, the volume of the storage chamber 18, and the percentage of each of the gases in the mixture of gases. Normally, the mixture of gases in the storage chamber 18 may be at a pressure of 500 to 5,000 pounds per square inch (psi). Preferably, the mixture of gases in the storage chamber 18 is at a pressure of 1,000 to 3,000 psi. However, the present invention is applicable to any such combustible mixture of gases regardless of pressure.

As further shown in FIGS. 1 and 2, the inner end portion 34 of the plug member 30 has a rupturable wall 40. The rupturable wall 40 has a circular shape centered on the axis 26. A cylindrical inner surface 42 of the plug member 30 extends coaxially from the rupturable wall 40 to the outer end surface 35 on the outer end portion 32. The cylindrical inner surface 42 thus defines a cylindrical central passage 46 having a closed end at the rupturable wall 40 and an open end at the outer end surface 35. Four cylindrical inner surfaces 48 of the plug member 30, two of which are shown in FIGS. 1 and 2, define radially extending passages 50 which communicate the central passage 46 with the exterior of the plug member 30.

The parts of the plug assembly 16 for detecting leakage from the storage chamber 18 include the rupturable wall 40 at the inner end portion 34 of the plug member 30. As shown in enlarged detail in FIG. 3, the rupturable wall 40 has an inner side surface 60 facing the storage chamber 18, and an outer side surface 62 facing the central passage 46 in the plug member 30. The rupturable wall 40 also has a circular central portion 64 and an annular peripheral portion 66. The peripheral portion 66 is relatively thin and flexible. The peripheral portion 66 thus supports the central portion 64 for movement along the axis 26 upon flexing of the peripheral portion 66. Specifically, the central portion 64 of the rupturable wall 40 will move along the axis 26 under the influence of a force which is directed axially against the rupturable wall 40 and which is great enough to deform the peripheral portion 66. When deformed elastically in small amounts, the peripheral portion 66 of the rupturable wall 40 exerts a bias urging the central portion 64 to move axially back toward its original position.

Before the storage chamber 18 is filled with the mixture of gases as described above, the inner and outer side surfaces 60 and 62 of the rupturable wall 40 are both subjected to ambient air pressure. The central portion 64 is then located in a position which is spaced slightly from the position shown in FIG. 3 in the axially inward direction, i.e., to the right as viewed in FIG. 3. When the storage chamber 18 is filled with the mixture of gases, the inner side surface 60 is subjected to the elevated pressure of the mixture of gases, while the outer side surface 62 remains subjected to ambient air pressure. The rupturable wall 40 is thus subjected to a gas pressure differential acting axially across the rupturable wall 40. The gas pressure differential results in a force that is directed against the rupturable wall 40 in the axially outward direction, i.e., to the left as viewed in FIG. 3. That force is great enough to deform the peripheral portion 66 sufficiently to move the central portion 64 into the position shown in FIG. 3, and to hold it in that position against the elastic bias of the peripheral portion 66. The central portion 64 of the rupturable wall 40 is thus located in the position shown in FIG. 3 under ordinary operating conditions of the vehicle occupant restraint apparatus 10.

If gas leaks from the storage chamber 18, the gas pressure acting against the inner side surface 60 of the rupturable wall 40 will decrease. The gas pressure differential acting axially across the rupturable wall 40, and hence the resulting force acting axially outward against the rupturable wall 40, will therefore decrease as a result of the leakage. If the leakage is significant, the decreased force acting axially outward against the rupturable wall 40 will no longer be great enough to hold the central portion 64 in its ordinary operating position against the bias of the elastically deformed peripheral portion 66. The peripheral portion 66 will then flex elastically back toward its original unflexed condition, and will move the central portion 64 axially inward toward its original position.

The central portion 64 of the rupturable wall 40 can also move along the axis 26 under the influence of a change in the ambient temperature. If the ambient temperature decreases significantly, the gas pressure within the sealed storage chamber 18 will decrease in a corresponding amount. The gas pressure differential acting axially across the rupturable wall 40 likewise will decrease in a corresponding amount. As a result, the central portion 64 of the rupturable wall 40 will move axially inward from the position shown in FIG. 3 in the same manner as described above with reference to leakage from the storage chamber 18. If the ambient temperature increases significantly, the resulting increase in the gas pressure differential acting axially across the rupturable wall 40 will similarly cause the central portion 64 to move axially outward (toward the left as viewed in FIG. 3) from the position shown in FIG. 3.

The parts of the plug assembly 16 for detecting leakage from the storage chamber 18 further include a sensing assembly 68. As shown in enlarged detail in FIG. 3, the sensing assembly 68 includes a sensor element 70, a bi-metal disk 72, and a disk holder 74.

The sensor element 70 is a metal strip, preferably stainless steel, having an intermediate section 76 and two opposite end sections 78. The sensor element 70 is supported in the plug member 30 by a support tube 80. The support tube 80 has a cylindrical outer surface 82, and is received closely within the central passage 46 in the plug member 30. The two opposite end sections 78 of the sensor element 70 are welded to the cylindrical outer surface 82 of the support tube 80 and are held firmly between the cylindrical inner surface 42 of the plug member 30 and the cylindrical outer surface 82 of the support tube 80. The intermediate section 76 of the sensor element 70 extends diametrically across the central passage 46.

Figure 4:
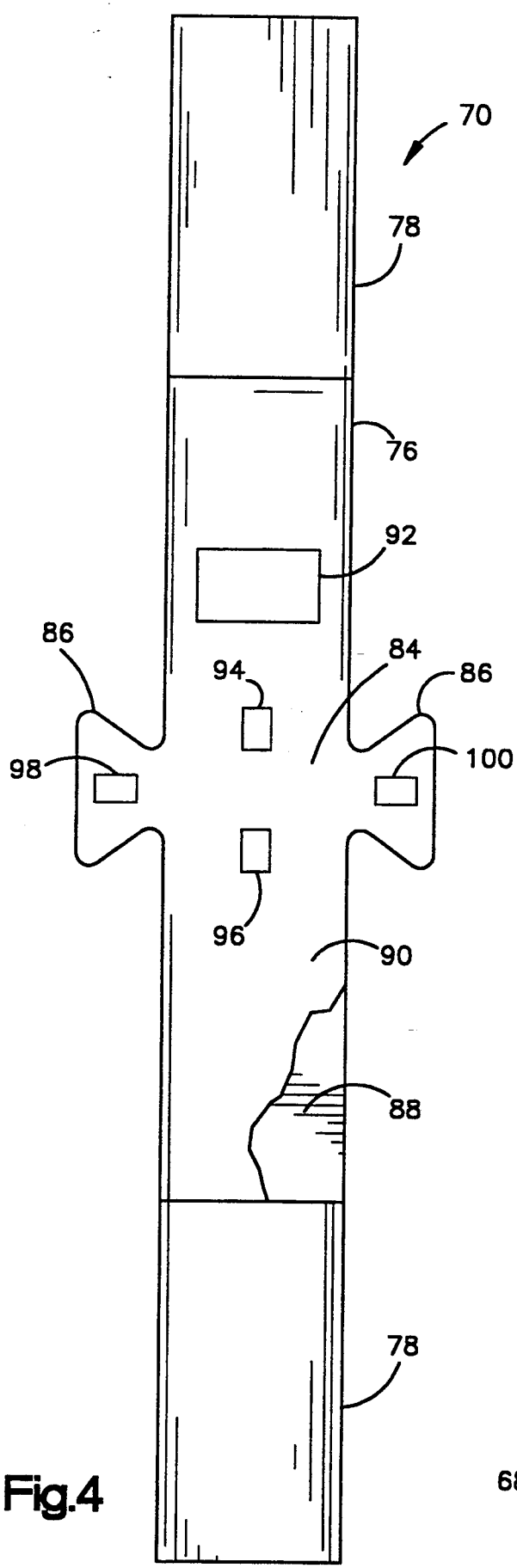
FIG. 4 is a view of parts of the apparatus of FIG. 1.

As shown in FIG. 4, the intermediate section 76 of the sensor element 70 includes a central portion 84 of the sensor element 70, and also includes a pair of tabs 86 extending laterally outward from opposite sides of the central portion 84. The intermediate section 76 further has a planar front surface 88 with a dielectric coating 90. A terminal bus 92 and four strain gauges 94, 96, 98 and 100 are supported on the dielectric coating 90, as shown schematically in FIG. 4. Two of the strain gauges 94 and 96 are located on the central portion 84.

Each of the other two strain gauges 98 and 100 is located on a respective one of the tabs 86.

If the intermediate section 76 of the sensor element 70 expands or contracts under the influence of a change in the ambient temperature, all four of the strain gauges 94, 96, 98 and 100 will respond equally. However, if the intermediate section 76 bends in a direction perpendicular to the front surface 88, the pair of strain gauges 94 and 96 on the central portion 84 will respond differently from the pair of strain gauges 98 and 100 on the tabs 86. The four strain gauges 94, 96, 98 and 100 are connected electrically in a Wheatstone bridge configuration. The Wheatstone bridge configuration develops an output signal that is functionally related to a difference in response between the two pairs of strain gauges. A change in the output signal thus indicates movement of the central portion 84 of the sensor element 70 to the left or right along the axis 26, as viewed in FIG. 3.

Figure 5:
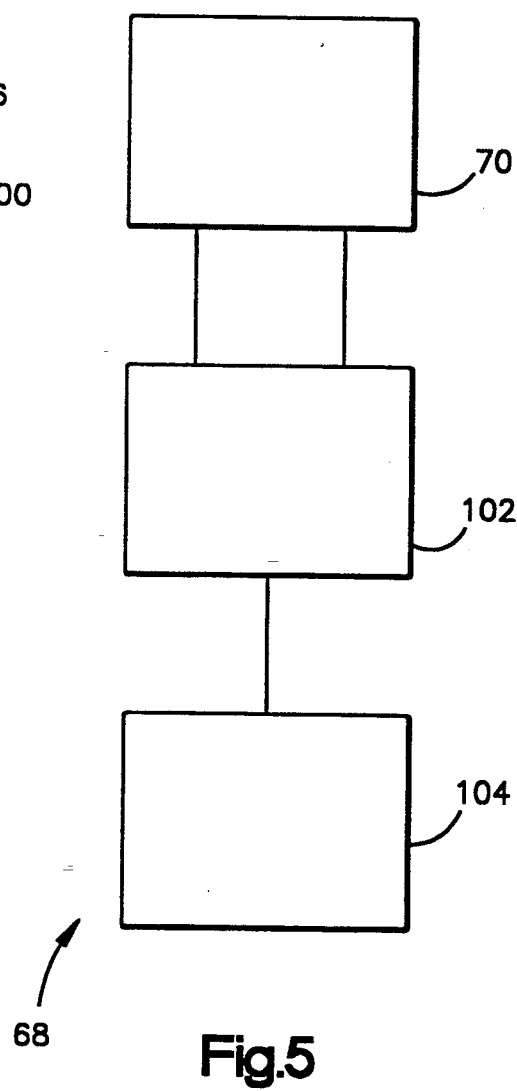
FIG. 5 is a schematic view of other parts of the apparatus of FIG. 1.

As shown schematically in FIG. 5, the sensing assembly 68 further includes a controller 102 and an indicator 104. The terminal bus 92 on the sensor element 70 connects the Wheatstone bridge configuration of strain gauges 94, 96, 98 and 100 (FIG. 4) with the controller 102 in a known manner. The controller 102 receives the output signal from the sensor element 70 and responds by generating an actuating signal whenever the output signal from the sensor element 70 deviates more than a certain amount from an expected nominal value. The controller 102 may, for example, comprise a comparator for comparing the output signal against a threshold representing minimum acceptable vessel pressure. The actuating signal generated by the controller 102 controls an indicator 104, which preferably comprises a lamp on the vehicle instrument panel. The controller 102 thus actuates the indicator 104 whenever vessel pressure drops to an unacceptable level.

Figure 3:
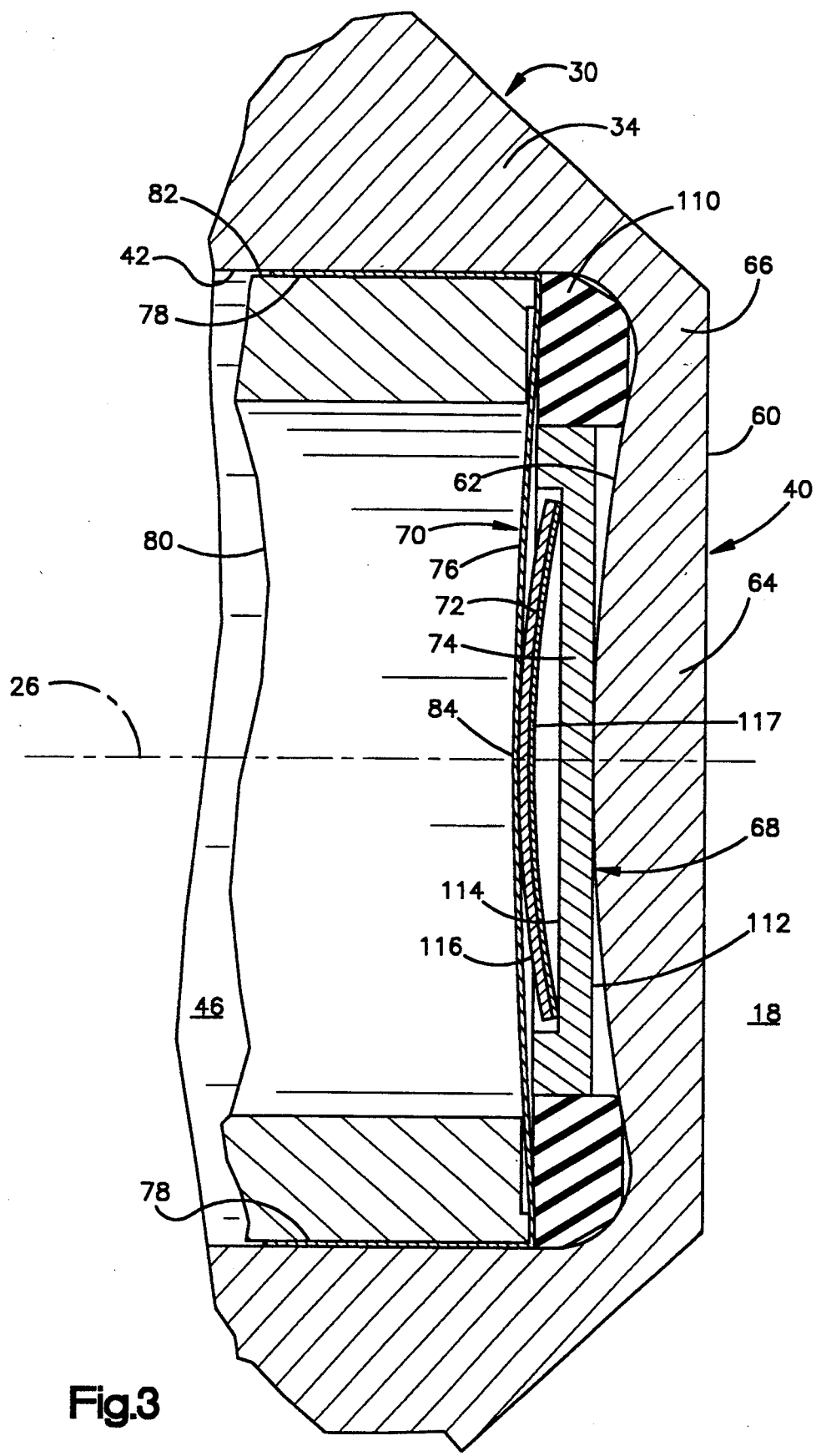
FIG. 3 is an enlarged partial view of the apparatus of FIG. 1.

As further shown in FIG. 3, the bi-metal disk 72 and the disk holder 74 are supported in the plug member 30 by an elastomeric spacer ring 110. The disk holder 74 has a rear surface 112 which abuts the central portion 64 of the rupturable wall 40. The disk holder 74 also has a recessed front surface 114 which defines a cavity facing the sensor element 70. The bi-metal disk 72 is a laminate of two materials having dissimilar coefficients of thermal expansion. The bi-metal disk 72 thus has a front lamination 116 and a rear lamination 117. The bi-metal disk 72 is received in the cavity defined by the surface 114, with the front lamination 116 abutting the central portion 84 of the sensor element 70. The bi-metal disk 72 operates in a known manner to deflect under the influence of changes in the ambient temperature. Specifically, the front lamination 116 of the bi-metal disk 72 has a coefficient of thermal expansion which is less than that of the rear lamination 117. The surface of the front lamination 116 abutting the sensor element 70 therefore becomes more convex upon a decrease in the ambient temperature, and becomes less convex upon an increase in the ambient temperature.

As described above, the central portion 64 of the rupturable wall 40 is initially moved axially outward to the position shown in FIG. 3 when the storage chamber 18 is being filled with the mixture of gases. The disk holder 74 is then moved axially outward by the central portion 64 of the rupturable wall 40, and in turn moves the bi-metal disk 72 axially outward against the sensor element 70. The sensor element 70 is thus moved into the ordinary operating position shown in FIG. 3 when the storage chamber 18 is being filled with the mixture of gases. When the sensor element 70 is in its ordinary operating position, it is bowed slightly outward along the axis 26, and is inherently biased to bend axially back inward along the axis 26 toward a flat position perpendicular to the axis 26. The sensing assembly 68 is then calibrated for the indicator 104 to become actuated upon movement of the central portion 84 of the sensor element 70 axially out of its ordinary operating position.

When the pressure vessel 14 experiences a significant amount of leakage from the storage chamber 18, the central portion 64 of the rupturable wall 40 moves axially inward, as described above. The axially inward bias of the sensor element 70 is great enough to move the bi-metal disk 72 and the disk holder 74 inward with the central portion 64 of the rupturable wall 40. The central portion 84 of the sensor element 70 then moves inward along the axis 26, and the indicator 104 is actuated to indicate to a vehicle occupant that leakage from the storage chamber 18 has occurred.

The bi-metal disk 72 undergoes thermal deflections which compensate for deflections of the central portion 64 of the rupturable wall 40 that are caused by thermal changes in vessel pressure. A decrease in the ambient temperature that causes the central portion 64 of the rupturable wall 40 to move axially inward, as described above, will also cause the bi-metal disk 72 to deflect so that the surface of the front lamination 116 becomes more convex. The bi-metal disk 72 is designed such that the front lamination 116 moves axially outward relative to the disk holder 74 in an amount equal to the amount that the central portion 64 moves axially inward. As a result, the bi-metal disk 72 holds the sensor element 70 from bending inwardly along the axis 26 from the ordinary operating position shown in FIG. 3. Conversely, an increase in the ambient temperature that causes the central portion 64 of the rupturable wall 40 to move axially outward will cause the surface of the front lamination 116 of the bi-metal disk 72 to become less convex. Therefore, the front lamination 116 will not move outwardly against the sensor element 70 to bend the sensor element 70 outwardly along the axis 26 from its ordinary operating position. The bi-metal disk 72 thus prevents the sensing assembly 68 from generating an output signal which would result in actuation of the indicator 104 when the rupturable wall 40 reacts to a vessel pressure change that is caused by a change in the ambient temperature, in the absence of leakage from the storage chamber 18.

The parts of the plug assembly 16 for releasing the mixture of gases from the storage chamber 18 include a squib holder 150. The squib holder 150 is a circular member which is held firmly against the annular outer end surface 35 of the plug member 30 by a surrounding crimped portion 152 of the plug member 30. The squib holder 150 has a cylindrical inner surface 154 which defines a passage extending axially through the center of the squib holder 150. The squib holder 150 also has a cylindrical portion 156 extending inward through the open end of the central passage 46 in the plug member 30. The cylindrical portion 156 supports a guide tube 158 within the central passage 46. The guide tube 158 is centered on the axis 26, and has an open end 159 facing the rupturable wall 40 at the close end of the central passage 46.

A squib 160 and a movable container 162 are contained within the guide tube 158. The squib 160 contains a pyrotechnic material, preferably $ZrKClO_4$, which generates products of combustion when burning. The squib 160 is supported in the guide tube 158 to emit the products of combustion of the pyrotechnic material in a direction along the axis 26 toward the movable container 162. The movable container 162 also contains a pyrotechnic material 164, preferably $BKNO_3$, which generates products of combustion when burning. The movable container 162 is located in the guide tube 158 between the squib 160 and the open end 159 of the guide tube 158. The movable container 162 is thus located in a position to emit the products of combustion of the pyrotechnic material 164 in a direction along the axis 26 toward the squib 160.

An electrical circuit 180 is associated with the plug assembly 16. The electrical circuit 180 includes a power source 182, which is preferably the vehicle battery and/or a capacitor, and a normally open switch 184. The switch 184 is preferably part of a vehicle deceleration sensor 186. The deceleration sensor 186 senses deceleration of the vehicle which is indicative of a collision, and closes the switch 184 in response to such deceleration. Such a deceleration sensor is known in the art. A pair of lead wires 188 in the electrical circuit 180 reach the squib 160 through an insulator 190 which is supported in the central passage defined by the surface 154 of the squib holder 150. The lead wires 188 are associated with the squib 160 in a known manner to actuate the squib 160 when electric current passes between the lead wires 188.

When the vehicle experiences a collision, the deceleration sensor 186 senses the deceleration of the vehicle that is caused by the collision and closes the switch 184. When the switch 184 is closed, electric current passes through the squib 160 between the lead wires 188. The pyrotechnic material in the squib 160 is then ignited, and produces combustion products which emerge from the squib 160. The combustion products emerging from the squib 160 ignite the ignitable material 164 in the movable container 162. The ignitable material 164 then produces and emits additional combustion products. The combustion products produced and emitted by the squib 160 and the movable container 162 develop an increasing gas pressure within the guide tube 158 between the squib 160 and the movable container 162. When the increasing gas pressure within the guide tube 158 reaches a predetermined elevated level, it moves the movable container 162 along the axis 26 and out through the open end 159 of the guide tube 158 toward the closed end of the central passage 46.

The movable container 162 destroys the sensor element 70, the bi-metal disk 72 and the disk holder 74 when it strikes those parts of the sensing assembly 68 upon reaching the closed end of the central passage 46. The movable container 162 further moves against the rupturable wall 40 forcefully enough to shear the central portion 64 of the rupturable wall 40 away from the peripheral portion 66, and thus opens the pressure vessel 14 as shown in FIG. 2. The mixture of gases is then released from the storage chamber 18 and flows outward through the central passage 46 and the radially extending passages 50 in the plug member 30. A diffuser assembly 200 with gas flow passages 202 further directs the mixture of gases to flow into the air bag 12 to inflate the air bag 12.

Additionally, the movable container 162 is moved out of the guide tube 158 forcefully enough to continue moving to the right, as viewed in FIGS. 1 and 2, from the plug member 30 to the opposite end of the storage chamber 18. A screen 204 preferably captures the movable container 162 at the opposite end of the storage chamber 18. The movable container 162 thus carries the ignitable material 164 into the mixture of gases in the storage chamber 18 when the ignitable material 164 is burning. The combustion products generated by the ignitable material 164 include heat, hot particles, and hot gases. These combustion products continue to be emitted from the movable container 162 as the movable container 162 moves through the mixture of gases in the storage chamber 18, and are thus dispersed in the mixture of gases sufficiently to ignite the fuel gas substantially uniformly and rapidly throughout the storage chamber 18.

When the fuel gas burns in the mixture of gases, it generates heat and gaseous products of combustion which increase the temperature and pressure of the mixture of gases. The mixture of gases is thus further pressurized upon actuation of the apparatus 10. The air bag 12 is inflated quickly to a fully inflated condition by the gas which is further pressurized upon burning of the fuel gas in the mixture of gases.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use in inflating a vehicle occupant restraint, said apparatus comprising:
   means for defining a pressure vessel for storing gas which is releasable to inflate the vehicle occupant restraint, said pressure vessel having a surface means for defining an opening and a closure means for closing said opening, said closure means including a plug assembly receivable in said opening to block the flow of said gas outward through said opening;
   said plug assembly having a wall which is subjected to a gas pressure differential acting across said wall, said gas pressure differential being defined in part by gas pressure within said pressure vessel, said wall being deflectable under the influence of a change in said gas pressure differential;
   said plug assembly further including detecting means for detecting leakage of gas from said pressure vessel which causes a change in said gas pressure differential, said detecting means including strain gauge means for generating an electrical signal in response to deflection of said wall; and
   said detecting means further including means for preventing generation of said electrical signal in response to deflection of said wall which occurs under the influence of a change in said gas pressure differential that is caused by a change in the ambient temperature of said pressure vessel.

2. Apparatus as defined in claim 1, further comprising releasing means for releasing said gas to flow outward through said opening in said pressure vessel, said wall of said plug assembly being a rupturable closure wall blocking the flow of said gas outward through said opening, said releasing means including means for rupturing said closure wall.

3. Apparatus as defined in claim 2 wherein said gas pressure differential is further defined in part by the ambient gas pressure acting on said pressure vessel.

4. Apparatus as defined in claim 3 further comprising a deflectable sensor member and means for deflecting said sensor member in response to deflection of said wall, said strain gauge means generating said electrical signal in response to deflection of said sensor member.

5. Apparatus as defined in claim 4 wherein said wall has an ordinary operating condition, said means for deflecting said sensor member holding said sensor member in a bent condition when said wall is in said ordinary operating condition, said strain gauge means generating said electrical signal in response to bending of said sensor member from said bent condition toward a relatively flat condition.

6. Apparatus as defined in claim 5 wherein said means for deflecting said sensor member includes temperature compensating means, said temperature compensating means preventing said sensor member from deflecting in response to deflection of said wall which occurs under the influence of a change in said gas pressure differential that is caused by a change in the ambient temperature of said pressure vessel.

7. Apparatus as defined in claim 6 wherein said sensor member, when in said bent condition, is inherently biased to bend toward said relatively flat condition.

8. Apparatus for use in inflating a vehicle occupant restraint, said apparatus comprising:
   means for defining a pressure vessel for storing gas which inflates the vehicle occupant restraint;
   pressure sensing means for sensing a change in gas pressure within said pressure vessel; and
   opening means for opening said pressure vessel to release said gas from said pressure vessel to inflate the vehicle occupant restraint, said opening means including means for destroying said pressure sensing means upon opening of said pressure vessel;
   said pressure vessel having a rupturable closure wall, said opening means rupturing said closure wall to open said pressure vessel and destroying said pressure sensing means upon rupturing said closure wall;
   said opening means including a movable opening member and means for moving said opening member forcefully against said closure wall to rupture said closure wall, said opening member having an initial position spaced from said closure wall, said pressure sensing means extending into the path of movement of said opening member from said initial position to said closure wall;
   said closure wall being movable in response to a change in pressure within said pressure vessel, said pressure sensing means including a movable sensor member and means for moving said sensor member in response to movement of said closure wall, said sensor member extending into said path of movement of said opening member;
   said apparatus further comprising signalling means for generating an electrical signal in response to movement of said sensor member, said signalling means extending into said path of movement of said opening member;
   said means for moving said sensor member bending said sensor member in response to movement of said closure wall, said signaling means including strain gauge means for sensing bending of said sensor member and for generating said electrical signal in response to bending of said sensor member, said strain gauge means being supported on said sensor member at a location in said path of movement of said opening member;

said means for moving said sensor member including temperature compensating means, said temperature compensating means preventing said sensor member from moving in response to movement of said closure wall which occurs under the influence of a change in gas pressure within said pressure vessel that is caused by a change in the ambient temperature of said pressure vessel, said temperature compensating means including a bi-metal disk which deflects under the influence of a change in the ambient temperature of said pressure vessel, said bi-metal disk being located in said path of movement of said opening member.

9. Apparatus for use in inflating a vehicle occupant restraint, said apparatus comprising:

means for defining a pressure vessel for storing gas at a storage pressure, said pressure vessel having a rupturable closure wall which closes said pressure vessel to block said gas from exiting said pressure vessel, said rupturable closure wall being subjected to said storage pressure and being deflectable under the influence of a change in said storage pressure;

opening means for rupturing said rupturable closure wall to open said pressure vessel and thereby to release said gas to exit said pressure vessel to inflate the vehicle occupant restraint; and pressure sensing means for sensing a change in said storage pressure, said pressure sensing means including means responsive to deflection of said rupturable closure wall under the influence of a change in said storage pressure.

10. Apparatus as defined in claim 9 wherein said rupturable closure wall has an ordinary operating condition and is deflectable from said ordinary operating condition under the influence of a change in said storage pressure, said pressure sensing means including signaling means for generating an electrical signal in response to deflection of said rupturable closure wall from said ordinary operating condition under the influence of a change in said storage pressure.

11. Apparatus as defined in claim 10 wherein said rupturable closure wall is deflectable from said ordinary operating condition under the influence of a change in said storage pressure that is caused by a change in the ambient temperature of said pressure vessel, said pressure sensing means including temperature compensating means, said temperature compensating means preventing said signalling means from generating said signal in response to deflection of said rupturable closure wall from said ordinary operating condition when such deflection occurs under the influence of a change in said storage pressure that is caused by a change in the ambient temperature of said pressure vessel.

12. Apparatus as defined in claim 9 wherein said opening means includes a movable opening member and means for moving said opening member forcefully against said rupturable closure wall to rupture said rupturable closure wall, said opening member having an initial position spaced from said rupturable closure wall, said means for moving said opening member including a pyrotechnic material which, when ignited, develops a gas pressure which acts against said opening member to move said opening member from said initial position to said rupturable closure wall.

13. Apparatus as defined in claim 12 wherein said opening member moves forcefully against said pressure sensing means and thus destroys said pressure sensing means upon moving from said initial position to said rupturable closure wall.

14. Apparatus for use in inflating a vehicle occupant restraint, said apparatus comprising:

means for defining a pressure vessel for storing gas at a storage pressure, said pressure vessel having a rupturable closure wall which closes said pressure vessel to block said gas from exiting said pressure vessel;

said rupturable closure wall being subjected to a gas pressure differential acting across said rupturable closure wall and being deflectable under the influence of a change in said gas pressure differential, said gas pressure differential being defined by the difference between said storage pressure and the ambient air pressure acting on said pressure vessel, said gas pressure differential thus being variable in response to a change in said storage pressure that is caused by leakage of said gas from said pressure vessel, and being further variable in response to a change in said storage pressure that is caused by a change in the ambient temperature of said pressure vessel;

opening means for rupturing said rupturable closure wall to open said pressure vessel and thereby to release said gas to exit said pressure vessel to inflate the vehicle occupant restraint; and pressure sensing means for sensing a change in said storage pressure, said pressure sensing means including signaling means for generating an electrical signal in response to deflection of said rupturable closure wall under the influence of a change in said gas pressure differential;

said pressure sensing means further including temperature compensating means, said temperature compensating means preventing said signalling means from generating said signal when said rupturable closure wall deflects under the influence of a change in said gas pressure differential that is caused by a change in the ambient temperature of said pressure vessel.

15. Apparatus as defined in claim 14 wherein said opening means includes a movable opening member and means for moving said opening member forcefully against said rupturable closure wall to rupture said rupturable closure wall.

16. Apparatus as defined in claim 15 wherein said opening member has an initial position spaced from said rupturable closure wall, said means for moving said opening member including a pyrotechnic material which, when ignited, develops a gas pressure which acts against said opening member to move said opening member from said initial position to said rupturable closure wall.

* * * * *